US006273263B1

United States Patent
Bergeron et al.

(10) Patent No.: US 6,273,263 B1
(45) Date of Patent: Aug. 14, 2001

(54) SEDIMENT AND SOIL REMEDIATION BY COLUMN FLOTATION

(75) Inventors: Mario Bergeron, Cap-Rouge; Denis Blackburn, Charlesbourg; Hugo St-Laurent, Québec; Anne Gosselin, Laterrière, all of (CA)

(73) Assignee: Institut National de la Recherche Scientifique, Quebec (CA)

( * ) Notice: Subject to any disclaimer, the term of this patent is extended or adjusted under 35 U.S.C. 154(b) by 0 days.

(21) Appl. No.: 09/421,128

(22) Filed: Oct. 19, 1999

(30) Foreign Application Priority Data

Oct. 19, 1998 (CA) .................................. 2251201

(51) Int. Cl.$^7$ ................ B03D 1/14; B03B 7/00
(52) U.S. Cl. ............................. 209/17; 209/164
(58) Field of Search .................. 209/4, 5, 7, 10, 209/11, 12.1, 13, 17, 18, 590, 162–167; 134/25.1, 40

(56) References Cited

U.S. PATENT DOCUMENTS

| 2,907,455 | * | 10/1959 | Sasaki ...................................... 209/5 |
| 4,851,123 | | 7/1989 | Mishra ................................. 210/609 |
| 4,923,125 | * | 5/1990 | Bateson et al. ........................ 241/20 |
| 5,268,128 | * | 12/1993 | Lahoda et al. ........................ 252/626 |

FOREIGN PATENT DOCUMENTS 0 647 483 * 4/1995 (EP) .

OTHER PUBLICATIONS

*Sediment Remediation An International Review*, Averett et al., pp. 596–605, Nov. 1994.
*Metha–The First Large–Scale Plant for Treatment of Harbour Sediments*, Detzner et al., pp. 235–242, Aufbereitungs–Technik Mineral Processing, 1993.

*Cleaning Contaminated Sediments by Separation on the Basis of Particle Size*, C. van Rijt, pp. 283–295, Water Science and Technology, vol. 28, No. 8–9, pp. 283–295, 1993.

*Conditioning Sediment & Soil for Site Remediation*, Richard P. Traver, Sep. 1996.

EPA Assessment and Remediation of Contaminated Sediments (ARCS) Program—Mineral Processing Pretreatment of Contaminated Sediments, EPA 905–R94–022, Oct. 1994.

SITE Superfund Innovative Technology Evaluation Program, Technology Profiles Eighth Edition, EPA 540/2–R90–017, Oct. 1995.

* cited by examiner

*Primary Examiner*—Donald P. Walsh
*Assistant Examiner*—Joseph C Rodriguez
(74) *Attorney, Agent, or Firm*—Nilles & Nilles SC

(57) ABSTRACT

Disclosed herein is a method for the removal of organic and inorganic contaminants from contaminated sediment or soil. The method comprises a first step of removal and disposal of very large debris while the smaller particle flow is directed to a second step of removal of organic contaminants preferably by means of attrition cell, conditioning tank and flotation columns, the remaining particulate flow, free of organic contaminants, is directed to a third step of removal of inorganic contaminants preferably by means of hydrocycloning to separately deal with very small particles of less than 20 microns, both particulate flows are then preferably subjected to column flotation to separate out the inorganic contaminants. Thus, the method of the present invention yields decontaminated soil or sediment and two distinct contaminant concentrates (organic and inorganic, respectively). Both concentrates can be recovered and used for various applications.

18 Claims, 1 Drawing Sheet

SEDIMENT AND SOIL REMEDIATION BY COLUMN FLOTATION

FIELD OF THE INVENTION

Figure 1:
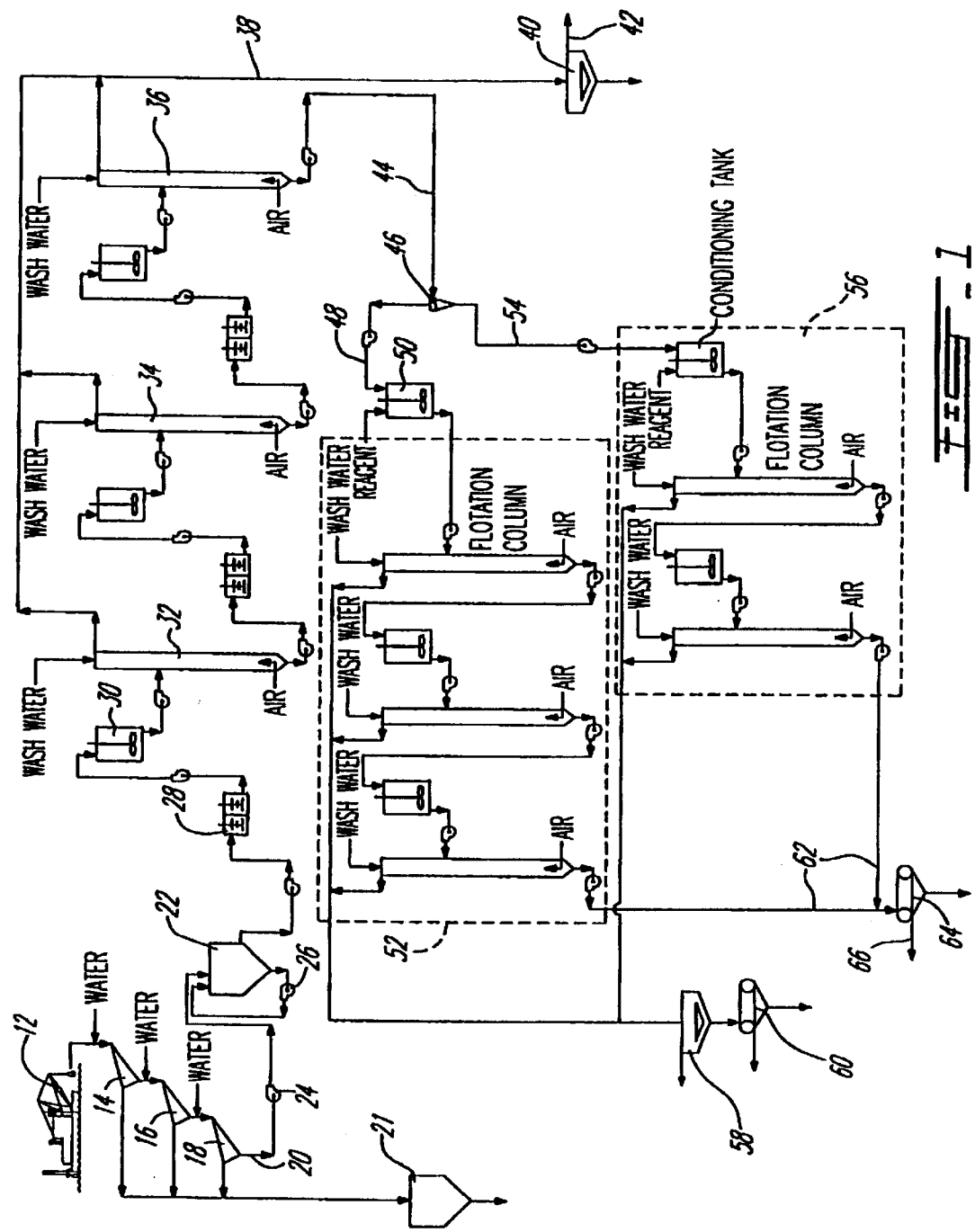

The present invention relates to the decontamination of soil and aquatic sediment.

BACKGROUND OF THE INVENTION

The soil and aquatic sediment in urban and industrial areas are prone to contamination resulting from industrial and transportation activities. In general, two major classes of contaminants have been identified, namely "organic" and "inorganic".

The organic contaminants, designated as total petroleum hydrocarbons (TPH) are usually water insoluble and are often adsorbed on the surface of mineral grains comprising soil or aquatic sediment. The inorganic contaminants, which comprise for example arsenic (As), barium (Ba), cadmium (Cd), chromium (Cr), copper (Cu), cobalt (Co), gold (Au), lead (Pb), mercury (Hg), molybdenum (Mo), nickel (Ni), selenium (Se), silver (Ag), tin (Sn), zinc (Zn), are found in the sediment matrix and in the soil as minerals, metal, chemical complexes or alloys. The concentrations of these specific elements with the exception of gold and silver are considered pollutants and are presently regulated by environmental agencies.

According to literature data (review in: U.S. EPA, 1994), "organic" and "inorganic" contaminants are mainly present in the soil and sediment fractions inferior to 45 microns in average particle size. This fraction often constitutes, on a dry basis, the bulk of the soil and sediment.

In harbour areas for instance, continuous wharf access for ships requires regular dredging of the harbour sediments. Because of pollution problems, sediment disposal associated with dredging operations is now regulated. Direct water disposal of contaminated dredged sediments is prohibited. Land-based disposal sites are still available, however the contamination level and the volume of sediments often renders these confinement operations very costly.

Current sediment decontamination techniques are summarized by Averett and Francingues, *Sediment Remediation: An International Review;* Second International Conference on Dredging and Dredged Material Placement—Volume 1;13–16 November 1994; Walt Disney World, Lake Buena Vista, Fla.; New York: American Society of Civil Engineers. Current chemical, thermal and biological treatment methods are plagued by their high costs and their difficulties in simultaneously handling organic and inorganic contaminants.

In Germany, Detzner, H. D.; Kitschen L., and Weimerskirch W., *METHA—The first large-scale plant for treatment of harbour sediments;* Aufbereitungs-Technik Mineral Processing. 1993; Vol. 34(No. 5):235–242 report a sediment remediation method using particle size separation. The technology uses hydrocyclones separation for sediment volume reduction. The sediment fraction smaller than 45 microns is not treated.

In the Netherlands, Van Rijt, C. *Cleaning contaminated sediments by separation on the basis of particle size;* Water Science and Technology 1994; Vol. 28 (No. 8–9):283–295. reports a similar approach at pilot scale. Again the sediment fraction smaller than 45 microns is not treated.

In the USA, Traver, R. P., 1996, *Conditioning sediment and soil for site remediation;* "Cleaning contaminated sediment Symposium", College of Engineering, University of Wisconsin, Madison, Wis., 19 p., Sep. 19, 1996 describes a pilot-scale sediment washing system evaluated for sediments contaminated with heavy metals. The heavy metals contained in the sediment fraction consisting of material larger than 45 microns are concentrated using flotation cells. The fine material, smaller than 45 microns is separated from the bulk of the sediment by hydrocycloning and are directly disposed of (without any treatment) at a specialized landfill at high costs. In fact one of the requirements, which greatly limit the usefulness of this technology to the treatment of fine sediment, is that "70% of the material to be treated must be greater than 45 microns in size" (Traver, 1996, p. 3).

U.S. Pat. No. 4,851,123 teaches the treatment of oily sludge by separating hydrophobic and hydrophilic components. The separation consists of three steps. The first step is based on size, the second on density, and the third on physicochemical differences. It is at the third step that the smaller and lighter fraction is routed to a flotation cell for the removal of the hydrophobic component.

EP 647, 483 teaches a similar method as U.S. Pat. No. 4,851,123, wherein a flotation cell is used to float out the hydrophobic component.

The United States Environmental protection agency (EPA) has conducted preliminary studies on hydrocarbon removal of aquatic sediments by froth flotation using flotation cells. (*Assessment and Remediation Of Contaminated Sediments (ARCS) Program*—Mineral Processing Pretreatment of Contaminated Sediments. Chicago, Ill.: Great Lakes National Program Office; 1994 October; EPA 905-R94-022). The EPA results indicated poor efficiency for material smaller than 45 microns. The EPA concluded that the technologies they had tested were not appropriate for the treatment of contaminated fine particles.

This agency also conducted reviews of current soil decontamination techniques (EPA, *Engineering Bulletin*—soil washing treatment Chicago, Ill.: Great Lakes National Program Office, (1990) EPA 540/2-R90-017 and EPA, *Technology Profiles Eight Edition* (1995) SITE ). The EPA concluded that the technologies they had tested were not appropriate for the treatment of contaminated fine particles of soil.

Thus there remains a need to develop an effective treatment method for sediment and soil remediation for the decontamination of material 45 microns or less.

It is an object of the present invention to provide a very fine (45 microns or less) particle treatment method characterized by cost-efficient handing of large volumes of sediment.

It is a further object of the present invention to provide a method wherein the decontamination performance meets all applicable environmental standards for returning decontaminated sediment to its aquatic environment or to non-specific landfill sites.

It is a further object of the present invention to provide a method wherein the decontamination performance meets all applicable environmental standards for returning the decontaminated soil to non-specific landfill sites.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

In general, the present invention provides a novel method for sediment remediation, wherein the sediment comprises organic and inorganic contaminants, the method generally comprising the steps of:

a) filtering out large non-contaminated debris from the sediment to yield a filtered sediment;

b) removing organic contaminants from the filtered sediment by two-phase separation and preferably by sequential passage thru attrition cell and flotation column to yield a stream of organic contaminant concentrate and a stream of partly decontaminated sediment;

c) removing inorganic contaminants from the sediment of step (b) by two-phase separation and preferably by sequential passage thru at least one hydrocyclone to separate a fine particle sediment flow and a larger particle sediment flow from the sediment of step (b) followed by separate passage of each of the fine particle and larger particles sediment flows thru pre-conditioning tanks to receiving frothing and collecting additives, and flotation columns to yield streams of inorganic contaminant concentrates and streams of decontaminated sediment;

d) recovering said streams of decontaminated sediment, organic contaminant concentrate and inorganic contaminant concentrate.

The present invention also provides a novel method for soil remediation, wherein the soil comprises organic and inorganic contaminants, the method generally comprising the steps of:

a) filtering out large non-contaminated debris from said soil to yield a filtered soil;

b) removing organic contaminants from the filtered soil by sequential passage thru attrition cell and flotation column to yield a stream of organic contaminant concentrate and a stream of partly decontaminated soil;

c) removing inorganic contaminants from the soil of step (b) by sequential passage thru at least one hydrocyclone to separate a fine particle soil flow and a larger particle soil flow from the soil of step (b) followed by separate passage of each of the fine particle and larger particles soil flows thru pre-conditioning tanks to receiving frothing and collecting additives, and flotation columns to yield streams of inorganic contaminant concentrates and streams of decontaminated soil;

d) recovering said streams of decontaminated soil, organic contaminant concentrate and inorganic contaminant concentrate.

IN THE DRAWINGS

FIG. 1 illustrates a preferred flow diagram of the method of the present invention.

DESCRIPTION OF THE PREFERRED EMBODIMENT

In a general aspect, the present invention comprises a method for the decontamination of soil or aquatic sediment which comprises as a first step the removal of organic contaminants from the total sediment or soil.

A flowsheet illustrating the various steps included in a preferred embodiment of the present invention is shown in FIG. 1.

The present invention firstly describes a method for the recovery of organic and inorganic contaminants from sediment, most suitably dredged harbour sediment. The contaminants are removed as concentrates and may be reclaimed for use as feedstock to other industries. In a preferred embodiment described hereafter, the method generally comprises the following steps:

a) screening of the sediment in order to remove a given non contaminated grain size fraction, b) attrition of the sediment in a suitable equipment, c) removal of organic contaminants by column flotation, d) classification of the remaining sediment by hydrocyclones in two fractions according to particle size, e) removal of inorganic contaminants in these fractions by column flotation with the addition of suitable flotation agents, f) dewatering of the two separate concentrates, one metallic, the other organic, that are reclaimed as valuable products, g) dewatering of the decontaminated sediment when required.

Referring to FIG. 1, dredged sediment 12, is first pretreated in a series of three vibrating screens 14, 16, 18, to separate out large particles such as concrete fragments, rocks, bottles, scrap metal, etc. and to remove excess water. It is to be understood that any conventional means capable of separating out the large components from soil can be used. Advantageously, the first two screens 14 and 16 are used to retain the largest particulate material that are sometimes present in sediment. Thereby protecting the equipment downstream of the screens. In this preferred embodiment, the apertures of these screens are set to 2.5 and 0.6 cm, respectively.

The purpose of the third screen 18, is to remove the non-contaminated sedimentary fraction. Indeed, it appears from work on samples obtained from different Canadian port facilities that the majority of contaminants are present in the fraction smaller than 600 microns. The aperture of this third screen 16 can be adjusted to a required grain-size depending on the grain-size distribution of the contaminant in the targeted material. Thus, as a non-limiting example in this invention, the third screen 18 is chosen to separate non-contaminated fraction larger than 1700 microns from the remaining contaminated fraction passing through the screen. The fraction larger than 1700 microns is directed to a storage tank 21 and eventually carted to a non-specific landfill.

During the screening procedure, water is preferably added to the sediment to facilitate the screening and to obtain a pulp 20 downstream of screen 18. Pulp 20 comprises water and the screened sediment in a weight ratio of solid/liquid varying from 1/10 to 1/20. Pulp 20 is pumped and routed into a container 22 via pump 24. Pulp 20 is continuously recirculated by a pump 26 to prevent material settling.

The first step in the preferred decontamination process is the removal of organic contaminants from pulp 20. Surprisingly, the removal of organic contaminants prior to the removal of inorganic contaminants yielded better results than vice-versa. It was discovered through experimentation that the presence of a high concentration of organic contaminants in pulp 20 was detrimental to the later removal of inorganic contaminants by flotation methods.

In a preferred embodiment, the contaminated homogeneous pulp 20 is routed to an attrition cell 28. The vigorous agitation within attrition cell 28 allows the separation of organic contaminants previously adsorbed at the surface of the contaminated minerals. Those skilled in the art will quickly understand that the attrition procedure is variable and can be readily adjusted depending on the nature of the material. Various conventional additives such as surfactants or attrition conditions such as temperature, agitation and ultrasounds may be used to facilitate the operation of the attrition cell. Pulp 20 is then routed to a conditioning tank 30.

In an optional embodiment of the present invention, the treatment in attrition cell 28 is omitted and the pre-screened sediment pulp 20 is routed directly to conditioning tank 30.

Conditioning tank 30 is used as a homogenization and treatment reservoir wherein optional frothing and collecting agents may be added prior to entry into flotation column 32.

It is to be noted that the use of frothing and collecting agents is optional. For most organic contaminants found in the sediment, the natural hydrophobic property of organic contaminants will not necessitate the use of these agents.

Various flotation devices may be used. However, it was found that flotation columns are preferable over flotation cells. Flotation cells have the apparent drawback of carrying away fine particles. For example, when using a sediment composed of 65% (weight) of grain-size particles smaller than 45 microns as a feed to a flotation cell, after the prerequisite attrition step, more than 50% of the total mass dragged to the flotation concentrate. Thus, the use of flotation columns is preferred.

Advantageously, flotation column 32 will be counter-current fed. Wash water is injected at the top, air bubbles are injected at the bottom and pulp 20 is fed at an appropriate column height level. This particular advantageous column design favours the probability of collisions between particles and air bubbles. Column size, height, pH adjustments and flow rates may also be optimized to provide efficient removal of organic contaminants without carrying away fine particles.

In a most preferred embodiment, flotation units consisting of attrition cell 28, conditioning tank 30 and flotation column 32 are disposed in series. Advantageously, a series of two to three units may be disposed so as to achieve high efficiency removal of organic contaminants.

It is to be understood that the number of flotation column equipment will be dependent on the nature of the sediment. For example, in a sample containing more than 2% (mass; 20000 ppm) of organic contaminants it was found best to use three flotation units in order to achieve acceptable recoveries for environmental standard purposes. Efficiency was in the order of 90% recovery.

The flotation concentrate 38 tapped at the top of columns 32, 34 and 36 is routed to a thickener 40 for removal of excess water. The thickened concentrate 42 may be directed to an appropriate container (not shown) for eventual use and sale as a reclaimed product.

After thickening, the organic concentrate obtained contains between 20–40% total petroleum hydrocarbons (TPH), from a starting sediment containing 2%. This final organic concentrate is acceptable as fuel for a cement furnace. The total mass of the organic concentrate obtained from the flotation procedure is less than 10% of the starting mass on a dry weight basis. The residual solids sink to the bottom of the column and are directed toward the next decontamination step aiming at the removal of the inorganic contaminants.

In accordance with the invention, the bottoms 44 exiting the last flotation column 36 are essentially free of organic contaminants and the remaining method steps are aimed at removing inorganic contaminants.

In a preferred embodiment bottoms 44 are pumped to one or more hydrocyclones 46 to separate bottoms 44 in two particle size fractions. The hydrocyclone 46 particle size cut is fixed at about 20 microns. The material smaller than about 20 microns generally designated by arrow 48, is directed to a conditioning tank 50 where, optionally, conventional flotation agents may be added. The function of the frothing agent is basically to act as a foaming agent to produce a constant froth composed of relatively small air bubbles. The collecting agent is a chemical which selectively adsorbs on the surfaces of a given mineral or metal conferring it hydrophobic properties. By interaction with air bubbles the collector/mineral complexes float out using appropriate flotation equipment. In a preferred embodiment, MIBC (methyl isobutyl carbinol) and KAX 51 (potassium amyl xanthate) were used as the frothing and collecting agents respectively.

The conditioned material is then pumped thru a series of flotation column and conditioning units generally designated as equipment group 52. While in the flotation columns, inorganic contaminants migrate to the top of the columns and are collected there as an inorganic concentrate.

In similar fashion, larger fraction 54 is routed thru a series of flotation column units 56.

Advantageously, the use of column flotation resulted in efficient inorganic contaminants recovery. Once again, frothing and collecting agents are optional in flotation column units 52 and 56. The height, size, pH adjustment and flow rates of wash water and air bubbles is optimized to produce efficient recovery of inorganic contaminants. Optionally, column flotation units may be replaced by cell flotation units or other suitable separation units.

Inorganic contaminant concentrates collected from the top of flotation column units 52 and 56 are routed to a thickener 58 where residual water is removed. For further upgrading of the resulting dewatered concentrate, a final dewatering operation was performed on a belt filter 60. The resulting dewatered concentrate may be recycled in a smelting operation for recovery of the metallic content.

The decontaminated sediment 62 sink to the bottom of the flotation column units 52 and 56. The number of flotation units (conditioning tank and column) vary from 1 to 3 approximately as a function of the concentration of the inorganic contaminants in the starting sediment. For example, in a sediment containing 0.3% (3000 ppm) total inorganic contaminants, the utilization of 3 flotation units was necessary in order to achieve 90% removal. A similar removal was reached with only 1 flotation unit for a sediment containing 0.05% total inorganic contaminants.

Sediment 62 can be dewatered on a belt filter 64 to provide a dry decontaminated sediment 66. Sediment 66 can be disposed at low cost in a landfill. Optionally, the dewatering steps may be skipped and the decontaminated sediment may be returned to its aquatic environment.

The inorganic concentrate obtained can also be recovered for its metallic content.

The water rejected by the process shows, for all studied samples, no apparent contamination and therefore can be discarded in accordance with on-site environmental regulations. If contamination of process water is present, a water treatment unit can be added to the process. In cases where water availability is problematic, water recycling can be performed.

Any means for routing and transferring the sediment or pulp throughout the process are within the scope of these invention.

The following invention is illustrated in further detail by the following non-limiting examples.

EXAMPLES

The implementation and results of the examples provided herein are summarized in Table 1.

The chemical analyses were carried out by gas chromatography for the organic contaminants. Because of analytical error inherent to the determination of organic contaminants (U.S.-EPA, 1994, ARCS Program) and sample heterogeneity the recovery of organic contaminants are reported as a range. The "inorganic" were analyzed by ICP-AES. Complementary mineralogical and screening analyses were also performed.

Example 1

The process included the attrition cell with no additional treatment and the use of three flotation units are used.

Example 2

The additional use of ultrasound at a frequency of about 19–20 kHertz, was carried out during the attrition step. The use of one flotation unit was sufficient to efficiently separate out the organic contaminants.

Example 3

The homogeneous pulp was heated to about 60° C. during the attrition step. The use of one flotation unit was sufficient to efficiently separate out the organic contaminants.

Example 4

A combination of heat 60° C. and ultra-sound (same conditions as described above) application was conducted during the attrition step. The use of one flotation unit was sufficient to efficiently separate out the organic contaminants.

Example 5

Surfactant solutions were added in the attrition cell. Two surfactant types were used separately: Witconol SN-70 manufactured by Witconol Inc. and Hastapur manufactures by Hoechst Inc. Other surfactants well known in the art can be used. The use of one flotation unit was sufficient to efficiently separate out the organic contaminants.

The recovery of the inorganic contaminants was not affected by any of the above provided examples.

Example 6

The attrition step was omitted and a combination of ultra-sound application (same as above) and surfactants addition (same as above) was conducted directly in the conditioning tank. Recovery of the organic contaminants and inorganic contaminants was comparable to previous examples.

Example 7

The organic contaminants were not removed. Their concentration being sufficiently low, therefore a specific treatment for the removal of organic contaminants was not required. The rest of the process was carried out in the same manner.

Example 8

A mineralogical characterization carried out before the treatment phase indicated that the inorganic contaminants were probably present in the sample as colloids. Preliminary tests conducted at laboratory scale showed that the inorganic contaminants were extracted with the organic contaminants during the organic contaminants flotation step. This step comprised the use of ultrasound application in the attrition cell. The final treatment procedure involved the use of only one flotation unit (attrition cell, conditioning tank and flotation column the flotation of the organic contaminants and inorganic contaminants being carried out simultaneously. For this last specific case, the concentrate obtained cannot be upgraded.

Although the invention has been described above with respect to a few representative examples and drawings, it will be evident to a person skilled in the art that it may be modified and refined in various ways. It is therefore wished to have it understood that the present invention should not be limited in scope, except by the terms of the following claims.

We Claim:

1. A method for sediment remediation of sediment that has a fraction of about 45 microns or less, wherein said sediment comprises organic and inorganic contaminants, said method comprising the steps of:
   a) filtering out large non-contaminated debris from said sediment to yield a filtered and still contaminated sediment;
   b) removing organic contaminants from the filtered sediment by two-phase separation comprising treatment by column flotation to yield a stream of organic contaminant concentrate and a stream of partly decontaminated sediment;
   c) removing inorganic contaminants from the partly decontaminated sediment of step (b) by two-phase separation comprising treatment by column flotation to yield a stream of inorganic contaminant concentrate and a stream of decontaminated sediment;
   d) recovering said streams of decontaminated sediment, organic contaminant concentrate and inorganic contaminant concentrate,
      whereby the sediment including the fraction of about 45 microns or less is decontaminated.

2. The method of claim 1 wherein column flotation in step (b) is effected in a series of column flotation units.

3. The method of claim 1 wherein in step (b), the two-phase separation is effected by flotation units comprising attrition cell, conditioning tank and flotation column.

4. The method of claim 3 wherein column flotation in step (c) is effected in a series of column flotation units.

5. A method for sediment remediation of sediment that has a fraction of about 45 microns or less, wherein said sediment comprises organic and inorganic contaminants, said method comprising the steps of:
   a) filtering out large non-contaminated debris from said sediment to yield a filtered sediment;
   b) removing organic contaminants from the filtered sediment by sequential passage thru attrition cell and flotation column to yield a stream of organic contaminant concentrate and a stream of partly decontaminated sediment;
   c) removing inorganic contaminants from the partly decontaminated sediment of step (b) by sequential passage thru at least one hydrocyclone to separate a fine particle sediment flow and a larger particle sediment flow from the sediment of step (b) followed by separate passage of each of the fine particle and larger particles sediment flows thru pre-conditioning tanks to receiving frothing and collecting additives, and flotation columns to yield streams of inorganic contaminant concentrates and streams of decontaminated sediment;
   d) recovering said streams of decontaminated sediment, organic contaminant concentrate and inorganic contaminant concentrate, whereby the sediment including the fraction of about 45 microns or less is decontaminated.

6. The method of claim 5 wherein in step c), the fine particle sediment flow contains particles of about 20 microns in diameter and smaller.

7. The method of claim 5 wherein in step b), passage thru the attrition cell is conducted concurrently with ultra-sound.

8. The method of claim 5 wherein the attrition cell is heated.

9. The method of claim 5 wherein the attrition cell contains surfactants.

10. A method for soil remediation of soil that has a fraction of about 45 microns or less, wherein said soil comprises organic and inorganic contaminants, said method comprising the steps of:
   a) filtering out large non-contaminated debris from said soil to yield a filtered and still contaminated soil;
   b) removing organic contaminants from the filtered soil by two-phase separation comprising treatment by column flotation to yield a stream of organic contaminant concentrate and a stream of partly decontaminated soil;
   c) removing inorganic contaminants from the partly decontaminated soil of step (b) by two-phase separation comprising treatment by column flotation to yield a stream of inorganic contaminant concentrate and a stream of decontaminated soil;
   d) recovering said streams of decontaminated soil, organic contaminant concentrate and inorganic contaminant concentrate,
      whereby the soil including the fraction of about 45 microns or less is decontaminated.

11. The method of claim 10 wherein column flotation in step (b) is effected in a series of column flotation units.

12. The method of claim 10 wherein in step (b), the two-phase separation is effected by at least one flotation unit comprising attrition cell, conditioning tank and flotation column.

13. The method of claim 12 wherein column flotation is effected in a series of column flotation units.

14. A method for soil remediation of soil that has a fraction of about 45 microns or less, wherein said soil comprises organic and inorganic contaminants, said method comprising the steps of:
   a) filtering out large non-contaminated debris from said soil to yield a filtered soil;
   b) removing organic contaminants from the filtered soil by sequential passage thru attrition cell and flotation column to yield a stream of organic contaminant concentrate and a stream of partly decontaminated soil;
   c) removing inorganic contaminants from th e partly decontaminated soil of step (b) by sequential passage thru at least one hydrocyclone to separate a fine particle soil flow and a larger particle soil flow from the partly de contaminated soil of step (b) followed by separate passage of each of the fine particle and larger particles soil flows thru pre-conditioning tanks to receiving frothing and collecting additives, and flotation columns too yield streams of inorganic contaminant concentrates and streams of decontaminated soil;
   d) recovering said streams of decontaminated soil, organic contaminant concentrate and inorganic contaminant concentrate,
      whereby the soil including the fraction of about 45 microns or less is decontaminated.

15. The method of claim 14 wherein in step c), the fine particle soil flow contains particles of about 20 microns in diameter and smaller.

16. The method of claim 14 wherein in step b), passage thru the attrition cell is conducted concurrently with ultra-sound.

17. The method of claim 14 wherein the attrition cell is heated.

18. The method of claim 14 wherein the attrition cell contains surfactants.

* * * * *